United States Patent
Lilja et al.

(10) Patent No.: US 11,763,576 B2
(45) Date of Patent: Sep. 19, 2023

(54) METHOD FOR DETERMINING A DRIVABLE AREA

(71) Applicant: Aptiv Technologies Limited, St. Michael (BB)

(72) Inventors: Adam Mats John Lilja, Gothenburg (SE); Markus Pär Oscar Carlander, Hisings-Kärra Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 70 days.

(21) Appl. No.: 17/198,121

(22) Filed: Mar. 10, 2021

(65) Prior Publication Data

US 2021/0331679 A1 Oct. 28, 2021

(30) Foreign Application Priority Data

Apr. 27, 2020 (EP) .................................... 20171491

(51) Int. Cl.
*G06V 20/56* (2022.01)
*G01C 21/00* (2006.01)
*B60W 30/095* (2012.01)
*B60W 40/06* (2012.01)
*B60W 50/00* (2006.01)
(Continued)

(52) U.S. Cl.
CPC ....... *G06V 20/588* (2022.01); *B60W 30/0956* (2013.01); *B60W 40/06* (2013.01); *B60W 50/0097* (2013.01); *G01C 21/3815* (2020.08); *G06V 10/80* (2022.01); *G06V 20/58* (2022.01)

(58) Field of Classification Search
CPC ............ B60W 40/06; B60W 30/0956; B60W 50/0097; G01C 21/3815
See application file for complete search history.

(56) References Cited

U.S. PATENT DOCUMENTS

| 7,124,027 B1 | 10/2006 | Ernst, Jr. et al. |
| 7,189,769 B2 | 3/2007 | Cody et al. |
(Continued)

FOREIGN PATENT DOCUMENTS

| CN | 103559791 A | 2/2014 |
| CN | 111401208 A | 7/2020 |
(Continued)

OTHER PUBLICATIONS

"Extended European Search Report", EP Application No. 20164443.2, dated Sep. 9, 2020, 10 pages.
(Continued)

*Primary Examiner* — Jeff A Burke
*Assistant Examiner* — Mohamad O El Sayah
(74) *Attorney, Agent, or Firm* — Sawtooth Patent Group PLLC

(57) ABSTRACT

In one aspect, the present disclosure is directed at a computer implemented method for determining a drivable area in front of a host vehicle. According to the method, a region of interest is monitored in front of the host vehicle by at least two sensors of a detection system of the host vehicle. The region of interest is divided into a plurality of areas via a computer system of the host vehicle, and each area of the plurality of areas is classified as drivable area, non-drivable area or unknown area via the computer system based on fused data received by the at least two sensors.

20 Claims, 6 Drawing Sheets

(51) Int. Cl.
*G06V 10/80* (2022.01)
*G06V 20/58* (2022.01)

(56) References Cited

U.S. PATENT DOCUMENTS

| | | | |
|---|---|---|---|
| 8,930,060 B1 | 1/2015 | Lu et al. | |
| 9,199,668 B2 | 12/2015 | Zeng et al. | |
| 9,470,777 B2 | 10/2016 | Arage | |
| 9,738,278 B2 | 8/2017 | Hasberg et al. | |
| 10,303,178 B1 | 5/2019 | Gutmann | |
| 10,303,492 B1 | 5/2019 | Wagner et al. | |
| 10,430,641 B2 | 10/2019 | Gao | |
| 10,564,647 B2 | 2/2020 | Balaghiasefi et al. | |
| 10,885,353 B2 | 1/2021 | Watanabe et al. | |
| 10,909,411 B2 | 2/2021 | Sano et al. | |
| 11,016,492 B2 | 5/2021 | Gier et al. | |
| 11,073,832 B1 | 7/2021 | Gutmann | |
| 11,132,611 B2 | 9/2021 | Sano et al. | |
| 11,195,028 B2 | 12/2021 | Lee et al. | |
| 11,222,438 B2 | 1/2022 | Sano et al. | |
| 11,250,288 B2 | 2/2022 | Sano et al. | |
| 11,276,189 B2 | 3/2022 | Niesen et al. | |
| 11,353,577 B2 | 6/2022 | Liu et al. | |
| 11,393,097 B2 | 7/2022 | Brunner et al. | |
| 11,475,678 B2 | 10/2022 | Myeong et al. | |
| 11,530,921 B2 | 12/2022 | Nimmagadda et al. | |
| 11,544,940 B2 | 1/2023 | Baik et al. | |
| 11,555,927 B2 | 1/2023 | Huang et al. | |
| 2007/0005306 A1 | 1/2007 | Foessel | |
| 2009/0143951 A1 | 6/2009 | Takahashi et al. | |
| 2012/0053755 A1 | 3/2012 | Takagi | |
| 2015/0012204 A1 | 1/2015 | Breuer et al. | |
| 2015/0353062 A1 | 12/2015 | Breuer et al. | |
| 2015/0353083 A1* | 12/2015 | Hasberg | G05D 1/0274 701/1 |
| 2016/0116916 A1 | 4/2016 | Pink et al. | |
| 2017/0083021 A1 | 3/2017 | Balaghiasefi et al. | |
| 2017/0344844 A1 | 11/2017 | Sano et al. | |
| 2017/0344888 A1 | 11/2017 | Sano et al. | |
| 2017/0345182 A1 | 11/2017 | Sano et al. | |
| 2018/0074507 A1* | 3/2018 | Gao | G05D 1/0214 |
| 2018/0188059 A1 | 7/2018 | Wheeler et al. | |
| 2018/0189599 A1 | 7/2018 | Sano et al. | |
| 2018/0239969 A1* | 8/2018 | Lakehal-ayat | G05D 1/0246 |
| 2018/0329034 A1 | 11/2018 | Bilik et al. | |
| 2018/0350086 A1 | 12/2018 | Sweet, III et al. | |
| 2019/0050649 A1 | 2/2019 | Watanabe et al. | |
| 2019/0271549 A1 | 9/2019 | Zhang et al. | |
| 2019/0286153 A1 | 9/2019 | Rankawat et al. | |
| 2019/0318176 A1 | 10/2019 | Sano et al. | |
| 2019/0340775 A1 | 11/2019 | Lee et al. | |
| 2019/0346854 A1 | 11/2019 | Slutsky et al. | |
| 2019/0384302 A1* | 12/2019 | Silva | G05D 1/0248 |
| 2020/0103523 A1 | 4/2020 | Liu et al. | |
| 2020/0139959 A1* | 5/2020 | Akella | G05D 1/0088 |
| 2020/0183011 A1 | 6/2020 | Lin et al. | |
| 2020/0217950 A1 | 7/2020 | Unnikrishnan et al. | |
| 2020/0218907 A1 | 7/2020 | Baik et al. | |
| 2020/0218908 A1 | 7/2020 | Lee et al. | |
| 2020/0218909 A1* | 7/2020 | Myeong | G06V 10/764 |
| 2020/0218913 A1* | 7/2020 | Unnikrishnan | B60R 11/04 |
| 2020/0219264 A1 | 7/2020 | Brunner et al. | |
| 2020/0240795 A1 | 7/2020 | Nomura | |
| 2020/0249356 A1 | 8/2020 | Huang et al. | |
| 2020/0250485 A1 | 8/2020 | Nagori et al. | |
| 2020/0298853 A1 | 9/2020 | Bast | |
| 2020/0334544 A1 | 10/2020 | Liu et al. | |
| 2020/0356415 A1 | 11/2020 | Goli | |
| 2020/0361489 A1 | 11/2020 | Park et al. | |
| 2020/0378766 A1 | 12/2020 | Omari et al. | |
| 2020/0391729 A1* | 12/2020 | Liu | B60W 50/029 |
| 2021/0101624 A1 | 4/2021 | Philbin et al. | |
| 2021/0131823 A1 | 5/2021 | Giorgio et al. | |
| 2021/0181750 A1* | 6/2021 | Gogna | G08G 1/22 |
| 2021/0188286 A1 | 6/2021 | Ma et al. | |
| 2021/0278853 A1 | 9/2021 | Gier et al. | |
| 2021/0291816 A1 | 9/2021 | Lilja et al. | |
| 2021/0300353 A1 | 9/2021 | Carlander et al. | |
| 2021/0333380 A1 | 10/2021 | Lilja et al. | |
| 2021/0394761 A1 | 12/2021 | Steyer et al. | |
| 2022/0057232 A1 | 2/2022 | Shen et al. | |
| 2022/0180537 A1 | 6/2022 | Niesen et al. | |
| 2022/0373353 A1* | 11/2022 | Ding | G06K 9/6289 |

FOREIGN PATENT DOCUMENTS

| | | |
|---|---|---|
| DE | 102009009047 A1 | 8/2010 |
| DE | 102009022588 | 12/2010 |
| DE | 102016007630 | 12/2017 |
| DE | 102017217972 A1 | 4/2019 |
| DE | 102017126388 A1 | 5/2019 |
| DE | 102019205008 | 7/2020 |
| EP | 3364534 A1 | 8/2018 |
| GB | 2560322 A | 9/2018 |
| JP | 2018138402 | 9/2018 |
| WO | 2020140047 A1 | 7/2020 |

OTHER PUBLICATIONS

"Extended European Search Report", EP Application No. 20171489.6, dated Sep. 18, 2020, 11 pages.
"Extended European Search Report", EP Application No. 20171491.2, dated Sep. 28, 2020, 9 pages.
"Extended European Search Report", EP Application No. 20166617.9, dated Oct. 7, 2020, 7 pages.
Casapietra, et al., "Building a Probabilistic Grid-based Road Representation from Direct and Indirect Visual Cues", Jun. 2015, 8 pages.
Kunz, et al., "Fast Collision Checking with a Frenet Obstacle Grid for Motion Planning", Jun. 2014, pp. 95-104.
Nuss, "Consistent Environmental Modeling by use of Occupancy Grid Maps, Digital Road Maps, and Multi-Object Tracking", Jun. 2014, 7 pages.
Sundram, et al., "Development of a Miniature Robot for Multi-robot Occupancy Grid Mapping", Jul. 2018.
Weiss, "Robust Driving Path Detection in Urban and Highway Scenarios Using a Laser Scanner and Online Occupancy Grids", Jul. 2007, pp. 184-189.
"Extended European Search Report", EP Application No. 21157127.8, dated Jul. 9, 2021, 10 pages.
Joubert, et al., "Pose Uncertainty in Occupancy Grids through Monte Carlo Integration", Aug. 17, 2014, 6 pages.
Jungnickel, et al., "Efficient Automotive Grid Maps using a Sensor Ray based Refinement Process", Jul. 9, 2021, 8 pages.
"Extended European Search Report", EP Application No. 20209230.0, dated May 4, 2021, 10 pages.
"Extended European Search Report", EP Application No. 20211232.2, dated May 25, 2021, 10 pages.
"Extended European Search Report", EP Application No. 20214293.1, dated May 27, 2021, 10 pages.
Aihara, et al., "Free-Space Estimation for Self-Driving System Using Millimeter Wave Radar and Convolutional Neural Network", Mar. 2019, 4 pages.
BestTong ABS Plastic Junction Box . . . , available in Amazon.com, First available date Dec. 21, 2013, [Dec. 8, 2021], Available from the internet URL: https://www.amazon.com/dp/B016FCZPTM/ref=cm_sw_em_r_mt_dp_BTHQC2BSJT2JGAAAPJM4?_encoding=UTF8&psc=1 (Year: 2013).
C. Pfeffer, R. Feger, C. Wagner, and A. Stelzer, "FMCW MIMO radar system for frequency-division multiple TX-beamforming," IEEE Trans. Microw. Theory Techn., vol. 61, No. 12, p. 42624274, Dec. 2013.
Chakraborty, et al., "An Overview of Face Liveness Detection", Apr. 2004, 15 pages.
Foroughi, et al., "Free Space Grid for Automotive Radar Sensors", Sep. 2015, pp. 249-256.
Gorzelany, et al., "Safety Last? Driver-Assist Features That Are Most Often Switched Off", Jul. 7, 2000, 5 pages.

(56) References Cited

OTHER PUBLICATIONS

Jianyu Chen, et al., "Constrained Iterative LQR for On-Road Autonomous Driving Motion Planning", 2017 IEEE 20th International Conference on Intelligent Transportation Systems (ITSC), Oct. 2017, 7 pages.
Jun Ma, et al., "Alternating Direction Method of Multipliers for Constrained Iterative LQR in Autonomous Driving", Nov. 1, 2020, 9 pages.
Li, et al., "High Resolution Radar-based Occupancy Grid Mapping and Free Space Detection", Mar. 2018, pp. 70-81.
Liang, et al., "PolyTransform: Deep Polygon Transformer for Instance Segmentation", Jan. 16, 2021, 10 pages.
Ling, et al., "Shooting and Bouncing Rays: Calculating the RCS of an Arbitrarily Shaped Cavity", Feb. 1989, pp. 194-205.
Liou, et al., "Modeling word perception using the Elman network", Jul. 2008, 9 pages.
Pyo, et al., "Front Collision Warning based on Vehicle Detection using CNN", International SoC Design Conference, 2016, Oct. 2016.
Qi, et al., "PointNet++: Deep Hierarchical Feature Learning on Point Sets in a Metric Space", Jun. 7, 2017, 14 pages.
Qi, et al., "Volumetric and Multi-View CNNs for Object Classification on 3D Data", Apr. 29, 2016', 14 pages.
Suzuki, et al., "Topological Structural Analysis of Digitized Binary Images by Border Following", Apr. 1985, pp. 32-46.
Zhao, et al., "Pyramid Scene Parsing Network", Apr. 27, 2017, 11 pages.
Zou, "Free Space Detection Based on Occupancy Gridmaps", Apr. 2012, 70 pages.

\* cited by examiner

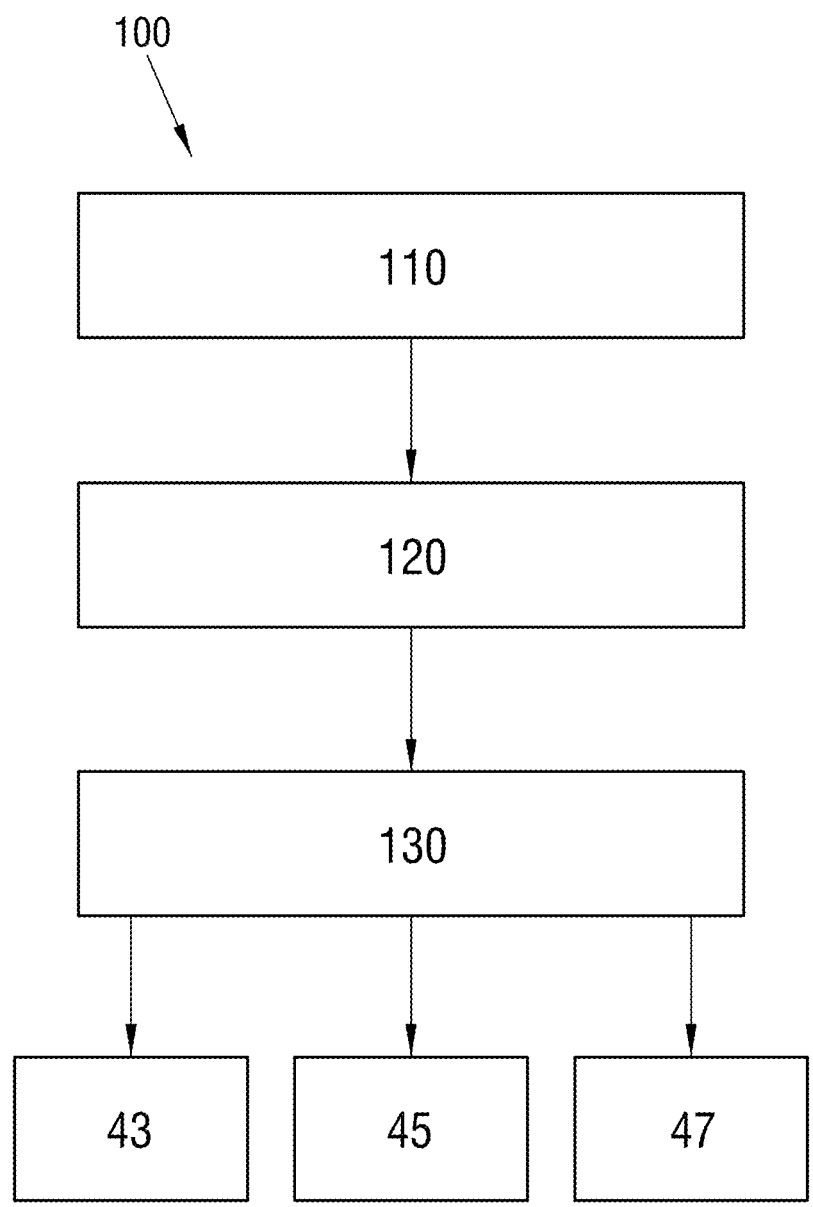

METHOD FOR DETERMINING A DRIVABLE AREA

CROSS-REFERENCE TO RELATED APPLICATION

This application claims priority to European Patent Application Number 20171491.2, filed Apr. 27, 2020, the disclosure of which is hereby incorporated by reference in its entirety herein.

BACKGROUND

The present disclosure relates to a method for determining a drivable area in front of a host vehicle.

Advanced driver assistance systems (ADAS) have been developed to support drivers in order to drive a host vehicle more safely and comfortably. In order to perform properly and due to safety reasons, the environment in front of a host vehicle needs to be monitored e.g. in order to determine a collision free space in a lane in front of the host vehicle.

In order to determine such a collision free space, objects in front of the host vehicle are usually detected e.g. by RADAR or vision sensors of the host vehicle. The collision free space is usually represented by its boundary, e.g. a polygon, enclosing an area between the host vehicle and one or more detected objects.

Furthermore, a so called occupancy grid may be used by applications of the advanced driver assistance systems. The occupancy grid comprises a plurality of cells for the area in front of the host vehicle, wherein for each cell of the occupancy grid information is available whether it is occupied by a detected obstacle or not. The inverse of the occupancy grid may be regarded as a non-blocked area representing the collision free space.

A drawback of both concepts, i.e. of the conventional representation of the free space and of the occupancy grid, is missing further information, e.g. regarding drivability, for the region in front of the host vehicle. If certain parts of this region are identified as collision free or as not occupied, this does not imply automatically that these parts of the region are indeed drivable by the host vehicle. There might be e.g. some abnormality within the lane in front of the host vehicle which may not be identified as a barrier via the RADAR or vision sensors of the host vehicle.

The conventional representation of the collision free space and the occupancy grid provide information regarding detected objects only, but they are not intended to provide further information regarding the properties of an area being regarded as collision free. Furthermore, both concepts are not able to distinguish between an unknown area for which information provided by the vehicle sensors is not yet available or not reliable, and an area being regarded as "negative" since it is definitely blocked, e.g. by a barrier.

A further drawback of the conventional representation of the collision free space is that no further information is available beyond the location of the detected object. Furthermore, the detected object may be a preceding vehicle moving e.g. with approximately the same velocity as the host vehicle. Due to the movement of the preceding vehicle, the actual free space being available in front of the host vehicle might be larger than the detected free space. If the detected free space is used only, assistance systems of the host vehicle might be deactivated unnecessarily since the free space in front of the host vehicle is assumed to be too narrow for a proper performance of these systems.

Regarding the conventional occupancy grid, the grid size, i.e. the number of cells of the grid, needs to be very large in many cases in order to cover the environment in front of the host vehicle properly. If the longitudinal and lateral extension of the occupancy grid needs to be increased, the number of cells being required increases quadratically.

Accordingly, there is a need to have methods and vehicle-based systems which are able to validate areas in front of a host vehicle.

SUMMARY

The present disclosure provides a computer implemented method, a vehicle-based system, a computer system and a non-transitory computer readable medium according to the independent claims. Embodiments are given in the subclaims, the description and the drawings.

In one aspect, the present disclosure is directed at a computer implemented method for determining a drivable area in front of a host vehicle. According to the method, a region of interest is monitored in front of the host vehicle by at least two sensors of a detection system of the host vehicle. The region of interest is divided into a plurality of areas via a computer system of the host vehicle, and each area of the plurality of areas is classified as drivable area, non-drivable area or unknown area via the computer system based on fused data received by the at least two sensors.

Since fused data of at least two sensors are used for classifying the areas in front of the vehicle, the method provides detailed information regarding drivability for the region of interest into which the host vehicle is going to move. The two sensors may include a vision sensor like a camera and/or a RADAR system or a LIDAR system which are already available in the host vehicle. Therefore, the method may be implemented at low cost since no additional hardware components are required.

Data from different kinds of sensors may be used for the classification of the areas. Moreover, the data which are fused by the method for the classification may be pre-validated in order to provide e.g. information regarding detected objects and/or regarding properties of the lane in front of the host vehicle. That is, a flexible and modular approach regarding the data provided by the at least two sensors may be implemented for the method. In addition to an obstacle free space in front of the vehicle, further information is provided by the method due to the classification of areas within and beyond the obstacle free space. The areas classified as drivable areas may be regarded as representing a drivable surface in front of the host vehicle. Such a drivable surface provided by the method may constitute a necessary input for autonomous driving level 3 or higher.

Due to the classification of areas as drivable areas, non-drivable areas or unknown areas, the safety of the host vehicle is improved in comparison to determining an obstacle free space in front of the host vehicle only. Furthermore, the method distinguishes between areas which are definitely regarded as non-drivable and areas which are regarded as unknown so far. The unknown area may be further validated by additional sensor data in order to clarify their status. However, the unknown areas may be assessed as risky regarding drivability momentarily.

The method may comprise one or more of the following features.

Via the detection system an obstacle free space may be detected in front of the host vehicle and road information may be determined. An area of the plurality of areas may be classified based on the free space and based on the road information. Detecting the obstacle free space in front of the host vehicle may comprise detecting at least one object in front of the host vehicle and tracing a trail of the object in order to identify whether the at least one object is a moving object or a static object.

An area of the plurality of areas may be classified as non-drivable area if the area is blocked at least partly by an identified static object. Furthermore, it may be determined whether an identified moving object is a target vehicle preceding the host vehicle. An area of the plurality of areas may be classified as drivable area if the area is disposed in a lane between the target vehicle and the host vehicle. A current velocity of the target vehicle may be determined via the detection system, and an extension of the obstacle free space may be estimated via the computer system of the host vehicle-based on the current velocity of the target vehicle and based on a prediction of an emergency braking distance and/or an emergency steering distance of the target vehicle.

A road model may be generated based on the road information determined by the detection system of the host vehicle and/or based on at least one predefined map being stored via the computer system. An abnormality may detected at or within a surface of a lane in front of the host vehicle, and an area of the plurality of areas may be classified as non-drivable area if the area is at least partly occupied by the abnormality. A reliability value may be determined for each of the plurality of areas based on a fusion of data provided by the at least two sensors, and each area may be classified based on the reliability value.

Dividing the region of interest into the plurality of areas may comprise forming a dynamic grid in front of the host vehicle. The dynamic grid may comprise a plurality of cells and may be based on the course of a lane being determined in front of the host vehicle via the detection system. Forming the dynamic grid in front of the host vehicle may comprise detecting an indicator for the course of the lane in front of the host vehicle via the detection system, determining, via the computer system of the host vehicle, a base area based on the indicator for the course of a lane, and defining, via the computer system, the plurality of cells by dividing the base area in longitudinal and lateral directions with respect to the host vehicle.

A common boundary of the areas being classified as drivable areas may be determined, and a plurality of nodes may be defined along the boundary. The nodes may be connected via a polygon in order to generate a convex hull representing a drivable surface in front of the host vehicle.

According to an embodiment, an obstacle free space may be detected in front of the host vehicle and road information may be determined, both by using the detection system of the host vehicle including the at least two sensors. A certain area of the plurality of areas in front of the host vehicle may be classified as drivable area, non-drivable area or unknown area based on the obstacle free space and based on the road information. The road information may comprise information regarding the surface of the lane in which the host vehicle is momentarily driving and/or information regarding road delimiters or lane markings. Since the classification of an area is performed based on the further road information in addition to the obstacle free space, detailed and reliable information regarding drivability may be available for the assistance systems of the host vehicle.

Detecting the obstacle free space in front of the host vehicle may comprise detecting at least one object in front of the host vehicle and tracing a trail of the object. By this means the at least one object may be identified as a moving object or a static object. That is, in addition to a position of an object in front of the host vehicle, this object is categorized as moving or static by tracing its trail. Hence, additional information regarding the status of movement of the object may be used for the classification of areas in front of the host vehicle as drivable areas, non-drivable areas or unknown areas.

An area of the plurality of areas may be classified as non-drivable area if the area is blocked at least partly by an identified static object. If an area is regarded as "blocked", this area is not only regarded as occupied by any unspecified object. In addition, it may be determined by the at least two sensors if the static object is an actual barrier which blocks the driving course and should be avoided by the host vehicle, or if it does not really constitute an obstacle for driving.

Furthermore, it may be determined whether an identified moving object is a target vehicle preceding the host vehicle. An area of the plurality of areas may be classified as drivable area if the area is disposed in a lane between the target vehicle and the host vehicle. Since the target vehicle has already traversed certain areas in front of the host vehicle, these areas may obviously be regarded as drivable areas due to the "experience" of the target vehicle. Therefore, the assessment of certain areas in front of the host vehicle may be facilitated by tracing a target vehicle preceding the host vehicle.

In addition, a current velocity of the target vehicle may be determined via the detection system. Based on the current velocity of the target vehicle and based on a prediction of an emergency braking distance and/or an emergency steering distance of the target vehicle, an extension of the obstacle free space may be estimated via the computer system of the host vehicle. That is, the movement of the target vehicle is considered in order to determine an actually available free space in front of the host vehicle. The free space regarded as available for the host vehicle may therefore not be restricted to the current distance between the target vehicle and the host vehicle since the movement of the target vehicle is taken into account for an extension of the obstacle free space.

Since some assistance systems of the host vehicle may rely on the obstacle free space and may be deactivated if this obstacle free space is too small, these assistance systems may not be deactivated unnecessarily if the obstacle free space can be extended. On the other hand, emergency braking and emergency steering are taken into account by respective distances in order to consider a "worst case" for a change regarding the status of movement of the target vehicle. The maximum extension of the obstacle free space may therefore be limited by the emergency braking distance and the emergency steering distance in order to ensure the safety of the target vehicle and of the host vehicle.

According to another embodiment, a road model may be generated based on the road information determined by the detection system of the host vehicle and/or based on at least one predefined map being stored via the computer system. The road model may be regarded as a fused road model since information detected by the at least two sensors of the host vehicle and information from a predefined map may be used when the road model is generated. The road model may comprise information regarding the course of a lane in front of the host vehicle, information regarding boundaries of the lane and information regarding the surface of the lane. In addition, a vertical curvature of the lane may be estimated for the region of interest in front of the host vehicle. Since the road model comprising detailed information about the lane in front of the host vehicle may be used for classifying the areas in front of the host vehicle, the reliability of the classification may be improved.

Furthermore, an abnormality may be detected at or within a surface of a lane in front of the host vehicle. An area of the plurality of areas may be classified as non-drivable area if the area is at least partly occupied by the abnormality. Examples for such abnormalities may be a pothole within the surface of the lane, unexpected obstacles, e.g. due to lost items from other vehicles, or irregularities of the consistency of the lane. Such abnormalities may be assessed based on the fused data of the at least two sensors of the host vehicle. Based on such an assessment, certain areas within the lane in front of the host vehicle may be classified as non-drivable area.

A reliability value may be determined for each of the plurality of areas based on a fusion of data provided by the at least two sensors. Classifying an area of the plurality of areas may further be based on the reliability value. For example, an error analysis may be known for each sensor of the detection system which may be the basis for an error estimation for the information provided by each of the sensors. The data fusion for the at least two sensors may provide an error estimation as well for the fused data. The reliability value may be based on the fused error analysis. The reliability value may improve the classification of the areas, e.g. by defining a threshold for the reliability value in order to classify an area as drivable area. Conversely, if the reliability value for an area is below a further threshold, this area may be classified as unknown area.

According to a further embodiment, dividing the region of interest into a plurality of areas may comprise forming a dynamic grid in front of the host vehicle. The dynamic grid may include a plurality of cells and may be based on the course of a lane which is determined in front of the host vehicle via the detection system. Since the dynamic grid reflects the course of the lane in front of the host vehicle, the number of cells required for such a grid may be reduced since the grid is restricted to the region of interest in front of the host vehicle. Therefore, the computational effort for performing the method may be strongly reduced.

Forming the dynamic grid may comprise i) detecting an indicator for the course of the lane in front of the host vehicle via the detection system, ii) determining, via the computer system of the host vehicle, a base area based on the indicator for the course of the lane, and iii) defining, via the computer system, the plurality of cells by dividing the base area in longitudinal and lateral directions with respect to the host vehicle. The indicator for the course of the lane may include right and/or left margins of the lane and/or markers for the center of the lane. By this means, straight forward grid based information may be available for further applications of the host vehicle after each cell of the dynamic grid may be classified as drivable area, non-drivable area or unknown area. Depending on the resolution of the grid, very detailed information may be made available.

A reference line may be defined via the computer system of the host vehicle along the lane based on the indicator, and the reference line may be divided into segments. For each of the segments, a respective row of cells may be defined perpendicularly to the reference line. Generating the dynamic grid may be facilitated by defining such rows of cells corresponding to the segments of the reference line.

In addition, for each segment two respective straight lines may be defined perpendicularly to the reference line at a beginning and at an end of the segment, respectively. Each straight line may be divided into a predefined number of sections, and end points of the respective sections may define corners of a respective one of the plurality of cells. Such a definition of the corners for the respective cells of the dynamic grid, i.e. by using the end points of the sections, may further facilitate the generation of the dynamic grid and may therefore reduce the required computational effort.

According to a further embodiment, a common boundary may be determined for the areas which are classified as drivable areas. A plurality of nodes may be defined along this boundary, and the nodes may be connected via a polygon in order to generate the convex hull representing a drivable surface in front of the host vehicle. Such a representation of the drivable surface may be easily used by further applications for trajectory and motion planning of the host vehicle. Due to the straight forward representation via the polygon, the computational complexity is reduced for the further applications.

In another aspect, the present disclosure is directed at a vehicle-based system for determining a drivable area in front of a host vehicle. The system comprises a detection system and a computer system of the host vehicle. The detection system comprises at least two sensors being configured to monitor a region of interest in front of the host vehicle. The computer system is configured to divide the region of interest into a plurality of areas, and to classify each area of the plurality of areas as drivable area, non-drivable area or unknown area based on fused data received by the at least two sensors.

As used herein, a computer system may include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The computer system may further include memory (shared, dedicated, or group) that stores code executed by the processor.

In summary, the system according to the disclosure comprises two sub-systems for performing the steps as described above for the corresponding method. Therefore, the benefits and advantages as described above for the method are also valid for the system according to the disclosure.

The detection system of the host vehicle may comprise a visual system and/or a RADAR system and/or a LIDAR system being configured to monitor the environment of the host vehicle. The visual system, the RADAR system and/or the LIDAR system may already be implemented in the host vehicle. Therefore, the system may be implemented at low cost, e.g. by generating suitable software for validating, via the computer system, the data provided by the detection system.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically:

FIG. 6 depicts a flow diagram of a method for determining a drivable area in front of the host vehicle.

DETAILED DESCRIPTION

Figure 1:
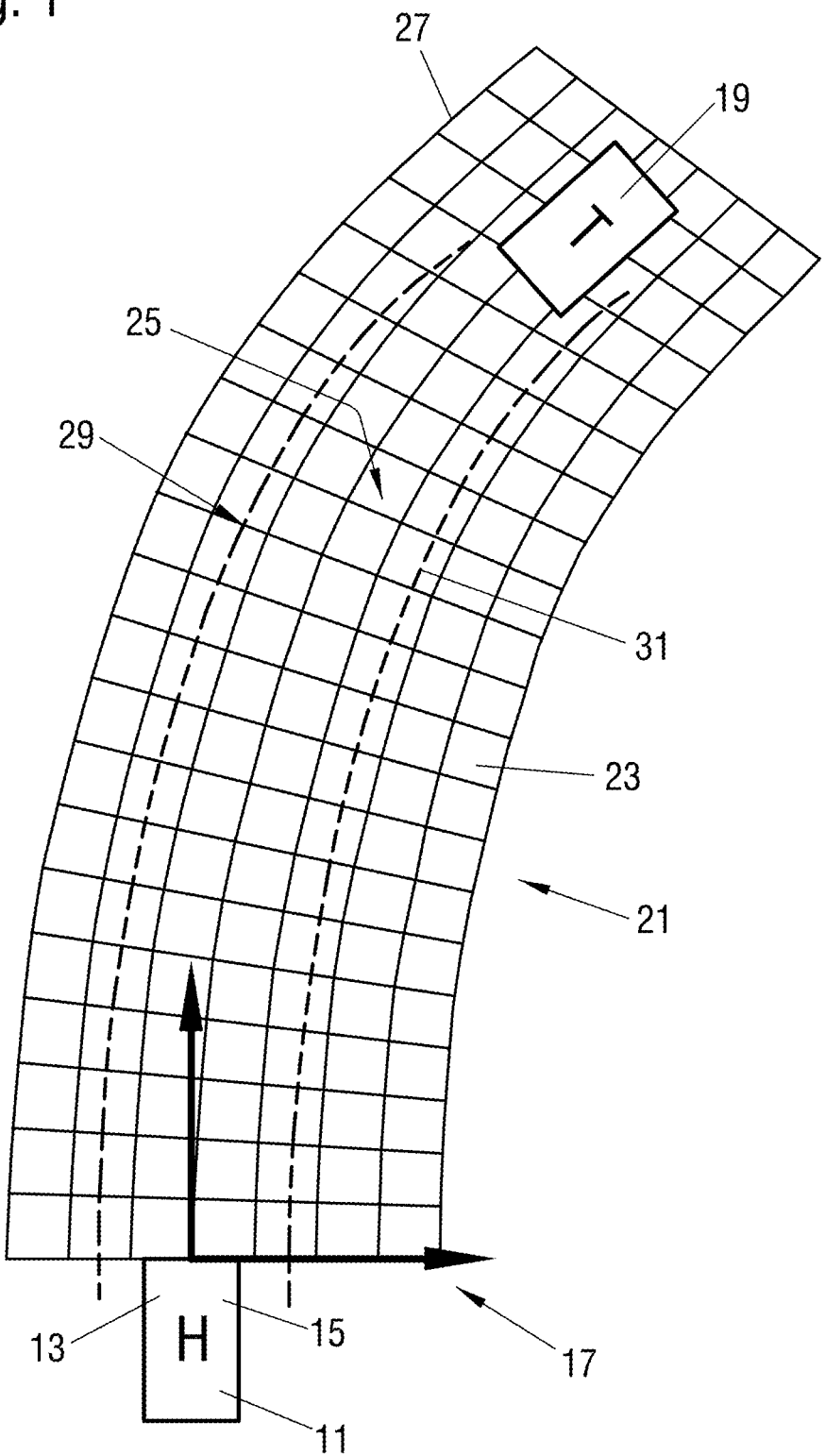
FIG. 1 depicts a dynamic grid in front of a host vehicle.

FIG. 1 schematically depicts a host vehicle 11 including a detection system 13 which is configured to monitor an environment of the host vehicle 11. The detection system 13 includes at least two sensors, e.g. sensors of a visual system and/or of a RADAR or LIDAR system, for monitoring the environment or a so-called "region of interest" in front of the host vehicle 11. The host vehicle 11 further includes a computer system 15 for processing the data provided by the detection system 13.

The host vehicle 11 further comprises a vehicle coordinate system 17 which is a Cartesian coordinate system including an x-axis extending in a lateral direction with respect to the vehicle 11 and a y-axis extending in a longitudinal direction in front of the host vehicle 11. As an example for an obstacle limiting a free space in front of the host vehicle 11, the existence and the position of a target vehicle 19 are detected by the detection system 13 of the host vehicle 11.

Furthermore, FIG. 1 depicts a schematic representation of a dynamic grid 21. The dynamic grid 21 includes a plurality of dynamic cells 23 and is adapted to the course of a lane 25 in front of the host vehicle 11. In detail, the dynamic grid 21 is defined via the computer system 15 of the host vehicle 11 for a base area 27 which corresponds to the region of interest in front of the host vehicle 11. In order to define the base area 27, a left margin 29 and the right margin 31 of the lane 25 are detected by the detection system 13 of the host vehicle 11. Since the left margin 29 and the right margin 31 limit the lane 25, the left and right margins 29, 31 are used as indicators for the course of the lane 25 in front of the host vehicle 11.

As mentioned above, the base area 27 for the dynamic occupancy grid 21 is intended to cover the region of interest for the host vehicle 11. For covering this region of interest properly, some areas beyond the left margin 29 and beyond the right margin 31 are included in the base area 27. That is, some parts of adjacent lanes, sidewalks and/or further environment like ditches may also be relevant for the further movement of the host vehicle 11 and have therefore to be included into the base area 27. The base area 27 is further divided in a plurality of dynamic cells 23 in order to generate the dynamic occupancy grid 21.

Figure 2:
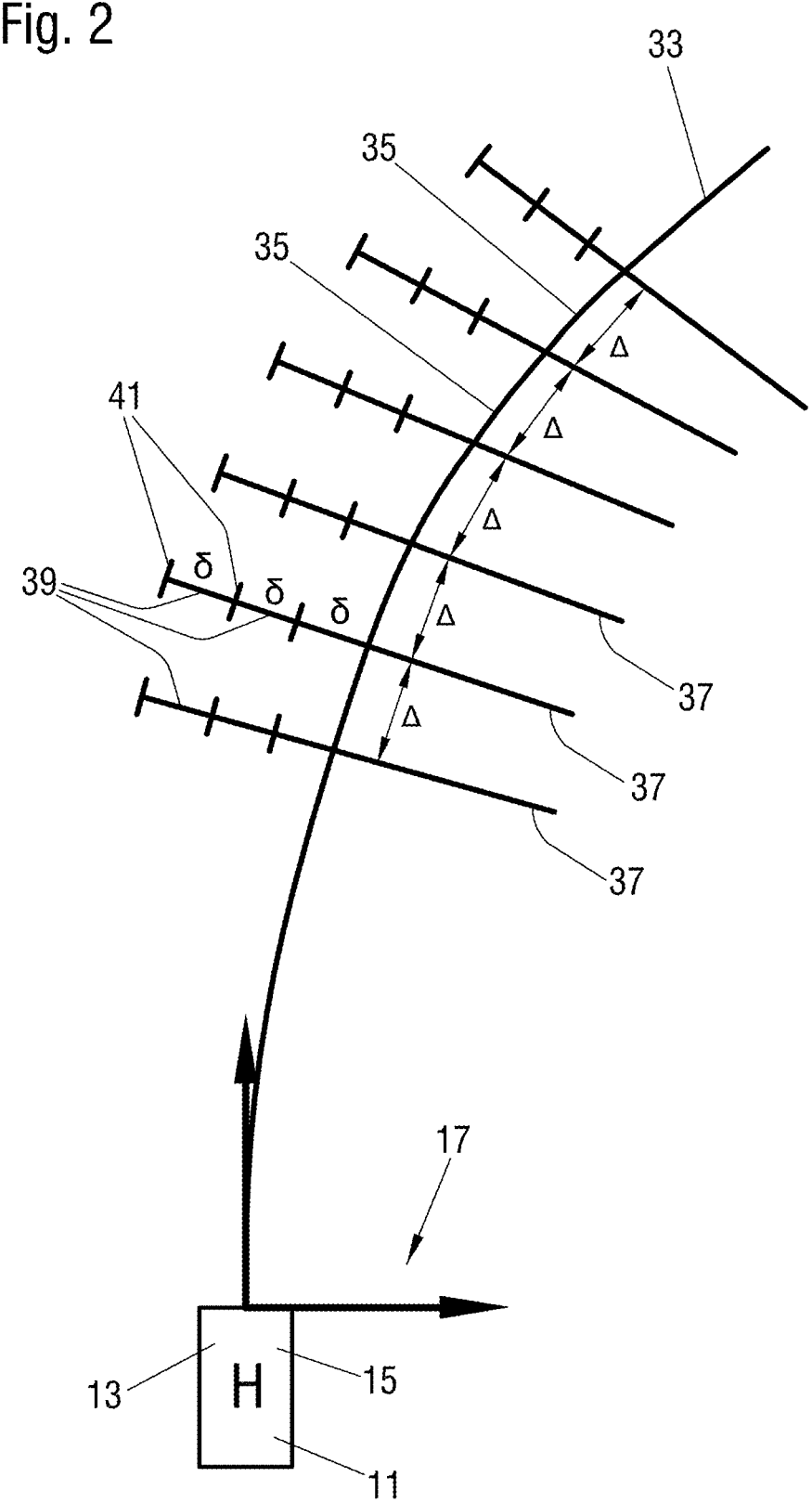
FIG. 2 depicts details for determining the dynamic grid as shown in FIG. 1.

FIG. 2 depicts in detail how the dynamic cells 23 of the dynamic occupancy grid 21 are generated via the computer system 15 of the host vehicle 11. A reference line 33 is defined which extends approximately in the center of the lane 25 in which the host vehicle 11 and the target vehicle 19 are driving momentarily. The reference line 33 is represented by a polynomial whose coefficients are derived from an indicator for the course of the lane 25 which is measured by the detection system 13 of the host vehicle 11, e.g. by measuring the course of the left margin 29 and the right margin 31 of the lane 25 as indicators for the course of the lane 25.

The reference line 33 represented by the polynomial is divided into a plurality of segments 35 having a constant length A along the reference line 27. For each segment 35, two straight lines 37 are defined extending perpendicularly to the reference line 33, respectively. That is, adjacent segments 35 have a common straight line 37 which delimits respective areas from each other extending on both sides of the reference line 33 between the straight lines 37. The straight lines 37 are further divided into sections 39 having a constant length δ. Therefore, end points 41 of the respective sections 39 also have a constant distance δ from each other.

The end points 41 of the sections 39 are used in order to define corner points for a respective dynamic cell 23 (see FIG. 1). In detail, two end points 41 of a section 39 being adjacent to each other and belonging to a first straight line 37 define two corner points of a dynamic cell 23, whereas two further end points 41 of a section 39 of the adjacent straight line 37 having the shortest distances to the first straight line 37 define two further corner points for the dynamic cell 23. That is, the four corner points of each dynamic cell 25 are defined by respective end points 41 of sections 39 belonging to adjacent straight lines 37 and having the shortest distance with respect to each other.

Due to the curvature of the reference line 33, the size of the dynamic cells 23 varies within the dynamic occupancy grid 21, as can be recognized in FIG. 1. In addition, the length of the segments 35 may be varied as an alternative along the reference line 31. For example, close to the host vehicle 11 a short length of the segments 35 may be used, whereas the length of the segments 35 may increase when their distance increases with respect to the host vehicle 11.

In the example as shown in FIG. 2, each segment 35 defines a row of dynamic cells 23, wherein this row extends perpendicularly to the reference line 33. If a predefined number of cells 23 is used for each row of cells 23 belonging to a certain segment 35, a constant lateral width of the dynamic occupancy grid 21 is defined corresponding to a constant lateral extension of the base area 27 corresponding to and covering the region of interest in front of the host vehicle 11.

Alternatively, the number of cells 23 for each row may be adjusted to the curvature of the lane 25 and the reference line 33. In detail, a greater number of cells 23 may be considered on a first side to which the reference line 23 is curved, e.g. on the right side as shown in FIGS. 1 and 2, whereas a smaller number of cells 23 is taken into account on the second side from which the reference line 33 departs. Such a situation is shown in FIG. 1 in which more cells 23 are present at the "inner side" of the lane 25 beyond the right margin 31, whereas less cells 23 are considered at the "outer side" of the left margin 29 of the lane 25.

Figure 3:
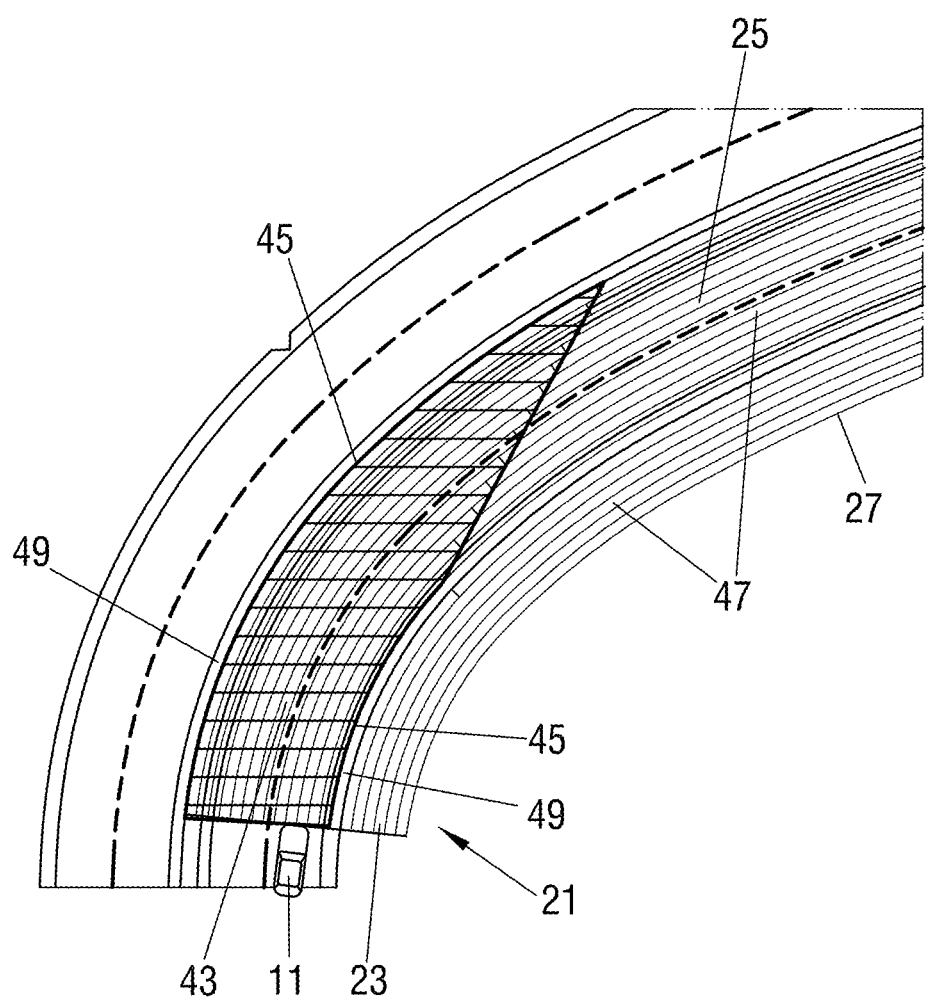
FIG. 3 depicts a classification of areas in front of the host vehicle according to the disclosure.

FIG. 3 depicts the host vehicle 11 and a part of a road including the lane 25 in which the host vehicle 11 is currently driving. The base area 27 corresponding to the region of interest in front of the host vehicle 11 is covered by the dynamic grid 21 which is described in detail in context of FIGS. 1 and 2. As can be seen in FIG. 3, the dynamic grid 21 comprising a plurality of cells 23 follows the course of the lane 25 and covers the base area 27 or region of interest in front of the host vehicle 11.

In detail, the dynamic grid 21 covers the lane 25 in which the host vehicle 11 is currently driving, an adjacent lane on the left side of the host vehicle 11, and a further region on the right side of the host vehicle 11. This region on the right side does not belong to the road anymore, but it might be of interest for some of the assistance systems of the host vehicle 11. Two further lanes on the left side of the host vehicle 11 are provided for oncoming traffic and are therefore not covered by the base area 27 restricting the dynamic grid 21.

As mentioned above, the detection system 13 of the host vehicle 11 includes at least two sensors, e.g. visual sensors and/or RADAR sensors and/or LIDAR sensors, which are configured to monitor the environment of the host vehicle 11. Via these sensors additional information is provided which allows classifying the cells 23 of the dynamic grid 21 as drivable areas 43, non-drivable areas 45 or unknown areas 47.

For example, one of the at least two sensors of the detection system 13 determines the position of road delimiters 49 on the left and right sides of the host vehicle 11, respectively. Therefore, the cells 23 of the dynamic grid 21 in which the road delimiters 49 are disposed are classified as non-drivable areas 45.

The same sensor and/or another sensor of the at least two sensors is configured to detect objects in the environment of the host vehicle 11 in order to determine an obstacle free space. As a result, the cells 23 which are located within the hatched area as shown in FIG. 3 are regarded as obstacle free and are classified as drivable areas 43. The hatched area in front of the host vehicle 11 may also be regarded as drivable surface.

For a part of the cells 23 no reliable information is available for at least one of the two sensors of the detection system 13, e.g. since these cells 23 are hidden behind an obstacle or out of range for the specific sensor. Hence, these cells 23 for which no reliable information is available by the relevant sensor of the at least two sensors are classified as unknown areas 47. As can be recognized in FIG. 3, the cells beyond the road limiter 49 on the right side of the host vehicle 11 are classified as unknown areas 47. In addition, cells belonging to the lane 25 and the adjacent lane on the left side of the host vehicle 11 are also classified as unknown areas 47 if these cells 23 are e.g. out of range of a visual sensor of the detection system 13.

Figure 4:
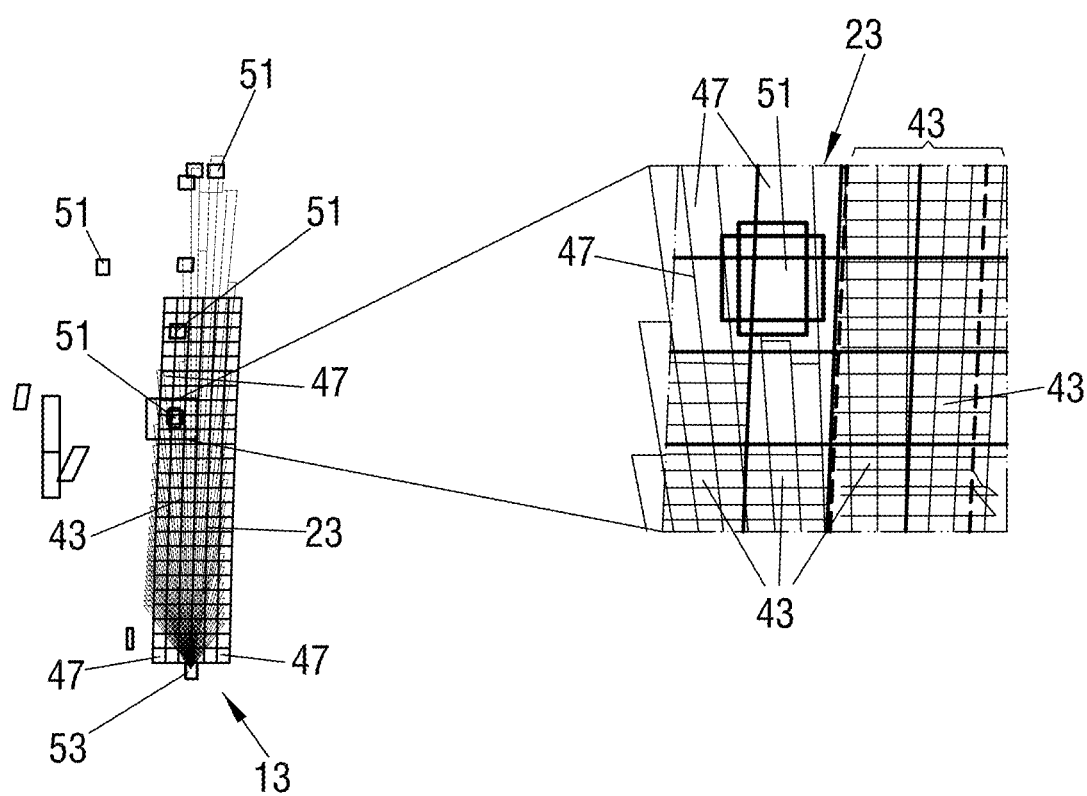
FIG. 4 depicts details for classifying areas in front of the host vehicle as drivable area.

FIG. 4 depicts details for classifying cells 23 of the dynamic grid 21 as drivable areas. A subset of the cells 23 of the dynamic grid 21 is shown on the left side of FIG. 4 together with objects 51 which are detected by a sensor 53, e.g. a visual sensor or a RADAR or LIDAR sensor, of the detection system 13 of the host vehicle 11. An enlarged section shown on the right side of FIG. 4 depicts one of the objects 51 and the cells 23 surrounding this object 51. The detected objects 51 delimit the obstacle free space in front of the host vehicle 11.

The cells 23 which are located between the sensor 53 and one of the objects 51 and which are not covered by any part of an object 51 are regarded as obstacle free and drivable. In other words, the cells 23 are located within an instrumental field of view of the sensor 53 and are free of any of the detected objects 51 in order to be classified as drivable areas 43. Conversely, the cells 23 which are covered at least partly by one of the detected objects 51 or which are located behind one of the objects 51 and are therefore "hidden from view" are classified as unknown areas 47. This is due to the fact that the objects 51 might be movable objects, e.g. other vehicles, and therefore the cells 23 which are covered momentarily by one of the objects 51 may be obstacle free and therefore drivable at a later instant of time. Currently, however, these cells 23 are occupied by one of the objects 51. Since this status might change in the near future, the cells 23 surrounding the object 51 and being located behind the objects 51 are regarded as unknown areas 47. In the enlarged section on the right side of FIG. 4, the cells 23 classified as drivable areas 43 are shown as hatched areas, whereas the cells 23 which are covered at least partly by the object 51 are classified as unknown areas 47.

In addition, there are cells 23 on the right and left sides of the sensor 53 which are outside the instrumental field of view of the specific sensor 53. Since no information is available for these cells via the specific sensor 53, these cells are also regarded as unknown areas 47.

Figure 5:
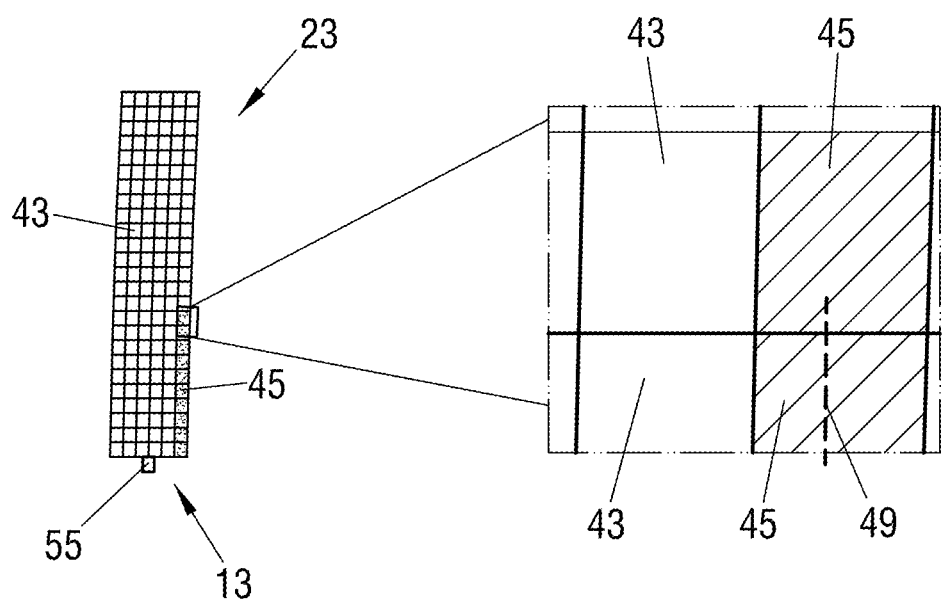
FIG. 5 depicts details for classifying areas in front of the host vehicle as non-drivable area.

FIG. 5 depicts details for classifying cells 23 of the dynamic grid 21 as non-drivable areas 45. On the left side of FIG. 5, the same subset of cells 23 is shown as on the left side of FIG. 4. Via a further sensor 55 of the detection system 13 of the host vehicle 11, a road delimiter 49 is detected in a lateral direction with respect to the host vehicle 11. The road delimiter 49 is shown in the enlarged section on the right side of FIG. 5.

The cells 23 of the dynamic grid 21 which are covered at least partly by the detected road delimiter 49 are classified as non-drivable areas 45. For the further cells 23 which are not covered by any part of the road delimiter 49, additional information is available via the sensor 53 (see FIG. 4) according to which these cells 23 can be regarded as obstacle free. Therefore, these cells 23 are classified as drivable areas 43.

In the enlarged section on the right side of FIG. 5, the cells 23 which are classified as non-drivable areas 45 are shown as diagonally hatched areas. In contrast, the cells 23 being classified as drivable areas 43 are not hatched.

As a further condition for classifying the cells 23, an abnormality may detected at or within a surface of the lane 25 in front of the host vehicle 11, e.g. via one of the sensors 53, 55 of the detection system 13. Such an abnormality may be e.g. a pothole or an item being lost by another vehicle. The area is classified as non-drivable area 45 if the area is at least partly occupied by the abnormality.

If an instrumental error is known for the respective sensors 53, 55 which are configured to detect different items in the environment of the host vehicle 11, a combined or fused error can be defined for the fused information provided by both sensors 53, 55. Based on the combined error for both sensors 53, 55, a reliability value may be defined for classifying the cells 23 of the dynamic grid 21.

When a drivable surface has been determined in front of the host vehicle 11 by combining the drivable areas 43 (see FIG. 3), a boundary of the drivable surface can be defined including nodes or edges which limit the drivable surface. These nodes or edges can be connected by a polygon in order to provide a convex hull representing the drivable surface in front of the host vehicle 11. This provides a straightforward representation for the drivable surface which can be easily used by further applications of the host vehicle 11 which include trajectory and motion planning features.

FIG. 6 depicts a flow diagram of a method 100 for determining a drivable area 43 in front of the host vehicle 11. At step 110, a region of interest is monitored in front of the host vehicle 11 by the at least two sensors 53, 55 of the detection system 15 of the host vehicle 11. The region of interest corresponds to the base area 27 which is used for determining the dynamic grid 21 in front of the host vehicle (see FIGS. 1 and 3)

Next, at step 120 the region of interest or base area 27 is divided into a plurality of areas via a computer system 15 of the host vehicle 11. The areas may correspond to the cells 23 of the dynamic grid 21, for example, as shown in FIG. 1 and in FIGS. 3 to 5.

Thereafter, at step 130 each area of the plurality of areas is classified as drivable area 43, non-drivable area 45 or unknown area 47 (see FIGS. 3, 4 and 5) based on fused data received by the at least two sensors 53, 55 via the computer system 15. The area is classified, for example, based on an obstacle free space in front of the host vehicle and based on road information which are determined via the detection system 13 of the host vehicle.

Based on the road information and/or based on at least one predefined map being stored via the computer system, a road model may be generated which is used for classifying the area. In addition, an abnormality may detected at or within a surface of the lane 25 in front of the host vehicle 11, e.g. via one of the sensors 53, 55. The area is classified as non-drivable area 45 if the area is at least partly occupied by the abnormality.

What is claimed is:

1. A method, comprising:
   monitoring, by at least two sensors of a detection system of a host vehicle, a region of interest in front of the host vehicle;
   dividing the region of interest into a plurality of areas;
   classifying each area of the plurality of areas as a drivable area, a non-drivable area, or an unknown area;
   responsive to classifying an area as a drivable area and determining that a target vehicle precedes the host vehicle, determining a current velocity of the target vehicle;
   estimating, based on the current velocity of the target vehicle having a positive value and based on a prediction of an emergency braking distance or an emergency steering distance related to the target vehicle, an extension of an obstacle free space in front of the host vehicle; and
   controlling the host vehicle based on the estimation of the extension of the obstacle free space in front of the host vehicle and the classifying of each area.

2. The method according to claim 1, further comprising:
   detecting, via the detection system, the obstacle free space in front of the host vehicle;
   determining, via the detection system, road information; and
   classifying, based on the obstacle free space and based on the road information, the area of the plurality of areas.

3. The method according to claim 2, wherein detecting the obstacle free space in front of the host vehicle comprises:
   detecting at least one object in front of the host vehicle; and
   tracing a trail of the object to identify whether the at least one object is a moving object or a static object.

4. The method according to claim 3, wherein an area of the plurality of areas is classified as a non-drivable area if the area is blocked at least partly by an identified static object.

5. The method according to claim 3, further comprising:
   determining whether an identified moving object is the target vehicle preceding the host vehicle; and
   classifying the area of the plurality of areas as a drivable area if the area is disposed in a lane between the target vehicle and the host vehicle.

6. The method according to claim 2, further comprising:
   generating, based on the road information or at least one predefined map, a road model.

7. The method according to claim 1, further comprising:
   detecting an abnormality on a surface of a lane in front of the host vehicle; and
   classifying the area of the plurality of areas as a non-drivable area if the area is at least partly occupied by the abnormality.

8. The method according to claim 1, further comprising:
   determining a reliability value for each area of the plurality of areas based on a fusion of data provided by the at least two sensors; and
   classifying each area based on the reliability value.

9. The method according to claim 1, wherein dividing the region of interest into the plurality of areas comprises forming a dynamic grid in front of the host vehicle, the dynamic grid comprising a plurality of cells and is based on a course of a lane being determined in front of the host vehicle via the detection system.

10. The method according to claim 9, wherein forming the dynamic grid in front of the host vehicle comprises:
    detecting, via the detection system, an indicator for the course of the lane in front of the host vehicle;
    determining, based on the indicator for the course of the lane, a base area; and
    defining the plurality of cells by dividing the base area in longitudinal and lateral directions with respect to the host vehicle.

11. The method according to claim 9, further comprising:
    determining a common boundary of the areas being classified as drivable areas; and
    defining a plurality of nodes along the boundary, the nodes being connected via a polygon to generate a convex hull representing a drivable surface in front of the host vehicle.

12. A system, comprising:
    a detection system comprising at least two sensors configured to monitor a region of interest in front of a host vehicle; and
    a computer system configured to:
    divide the region of interest into a plurality of areas;
    classify each area of the plurality of areas as a drivable area, a non-drivable area, or an unknown area;
    responsive to classifying an area as a drivable area and determining that a target vehicle precedes the host vehicle, determine a current velocity of the target vehicle;
    estimate, based on the current velocity of the target vehicle having a positive value and based on a prediction of an emergency braking distance or an emergency steering distance related to the target vehicle, an extension of an obstacle free space in front of the host vehicle; and control the host vehicle based on the estimation of the extension of the obstacle free space in front of the host vehicle and on the classifying of the area.

13. The system of claim 12, wherein the computer system is further configured to:

detect, via the detection system, the obstacle free space in front of the host vehicle;

determine, via the detection system, road information; and classify, based on the obstacle free space and based on the road information, the area of the plurality of areas.

14. The system according to claim 13, wherein the computer system is configured to detect the obstacle free space in front of the host vehicle by:

detecting at least one object in front of the host vehicle; and tracing a trail of the object to identify whether the at least one object is a moving object or a static object.

15. The system according to claim 13, wherein the computer system is further configured to:

generate, based on the road information or at least one predefined map being stored via the computer system, a road model.

16. The system according to claim 12, wherein the computer system is further configured to:

detect an abnormality on a surface of a lane in front of the host vehicle; and classify an area of the plurality of areas as a non-drivable area if the area is at least partly occupied by the abnormality.

17. The system according to claim 12, wherein the computer system is further configured to:

determine a reliability value for each area of the plurality of areas based on a fusion of data provided by the at least two sensors; and classify each area based on the reliability value.

18. The system according to claim 12, wherein the computer system is configured to divide the region of interest into the plurality of areas by:

forming a dynamic grid in front of the host vehicle, the dynamic grid comprising a plurality of cells and is based on a course of a lane being determined in front of the host vehicle via the detection system.

19. A non-transitory computer readable medium comprising instructions that, when executed, cause a processor to:

monitor, via at least two sensors of a detection system of a host vehicle, a region of interest in front of the host vehicle;

divide the region of interest into a plurality of areas;

classify each area of the plurality of areas as a drivable area, a non-drivable area, or an unknown area;

responsive to classifying an area as a drivable area and determining that a target vehicle precedes the host vehicle, determine a current velocity of the target vehicle;

estimate, based on the current velocity of the target vehicle having a positive value and based on a prediction of an emergency braking distance or an emergency steering distance related to the target vehicle, an extension of an obstacle free space in front of the host vehicle; and control the host vehicle based on the estimation of the extension of the obstacle free space in front of the host vehicle and the classifying of each area as a non-drivable area.

20. The non-transitory computer readable medium of claim 19, wherein the instructions, when executed, cause the processor to divide the region of interest into a plurality of areas by:

forming a dynamic grid in front of the host vehicle, the dynamic grid comprising a plurality of cells and is based on a course of a lane being determined in front of the host vehicle via the detection system.

* * * * *